(12) United States Patent
Fahmi et al.

(10) Patent No.: US 11,774,338 B2
(45) Date of Patent: Oct. 3, 2023

(54) STOKES-BASED METHOD TO ESTIMATE GELATION TIME

(71) Applicant: SAUDI ARABIAN OIL COMPANY, Dhahran (SA)

(72) Inventors: Mohanad M. Fahmi, Al Khobar (SA); Abdulkareem M. Alsofi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 289 days.

(21) Appl. No.: 17/076,215

(22) Filed: Oct. 21, 2020

(65) Prior Publication Data

US 2022/0120651 A1    Apr. 21, 2022

(51) Int. Cl.
    *G01N 11/10*     (2006.01)
    *G01N 11/00*     (2006.01)

(52) U.S. Cl.
    CPC ........ *G01N 11/10* (2013.01); *G01N 2011/002* (2013.01); *G01N 2203/0218* (2013.01)

(58) Field of Classification Search
CPC ... G01N 11/10; G01N 11/12; G01N 2011/002
See application file for complete search history.

(56) References Cited

U.S. PATENT DOCUMENTS

| | | | |
|---|---|---|---|
| 2,259,525 A * | 10/1941 | Landis | G01N 11/12 |
| | | | 73/54.16 |
| 2,731,828 A | 1/1956 | Parrette et al. | |
| 4,957,166 A | 9/1990 | Sydansk | |
| 5,211,054 A | 5/1993 | Muramatsu et al. | |
| 9,909,968 B2 | 3/2018 | Abhishek et al. | |
| 10,105,465 B2 | 10/2018 | Lee et al. | |

FOREIGN PATENT DOCUMENTS

| CN | 102135489 A | * | 7/2011 |
|---|---|---|---|
| CN | 204086075 U | * | 1/2015 |
| CN | 111337386 A | * | 6/2020 |
| CN | 212032422 U | * | 11/2020 |

(Continued)

OTHER PUBLICATIONS

Machine translation of CN-212032422-U (Year: 2020).*

(Continued)

*Primary Examiner* — Nathaniel J Kolb
(74) *Attorney, Agent, or Firm* — Osha Bergman Watanabe & Burton LLP

(57) ABSTRACT

Methods for determining the gelation period of a gel solution are provided. The methods provided include introducing a first inert ball, or first inert hollow ball comprising a polymer solution, into a gel solution container containing a gel solution where upon the first inert ball, or inert hollow ball, reaching a bottom of the gel solution container, at least one subsequent inert ball, or inert hollow ball, is introduced sequentially into the gel solution container until the at least one subsequent inert ball, or inert hollow ball remains fixed in place prior to reaching the bottom of the gel solution container. Methods also include determining the gelation time of the gel solution based on a sum of distances traveled by the first inert ball, or inert hollow ball, and at least one subsequent inert ball, or inert hollow ball.

20 Claims, 2 Drawing Sheets

(56) References Cited

FOREIGN PATENT DOCUMENTS

| DE | 19712395 C1 | * | 8/1998 | ............. G01N 11/12 |
| JP | 09243542 A | * | 9/1997 | |
| JP | 2000206023 A | * | 7/2000 | |
| WO | 2015038998 A1 | | 3/2015 | |

OTHER PUBLICATIONS

Machine translation of CN-111337386-A (Year: 2020).*
Machine translation of CN-204086075-U (Year: 2015).*
Machine translation of CN-102135489-A (Year: 2011).*
Machine translation of JP-2000206023-A (Year: 2000).*
Machine translation of DE-19712395-C1 (Year: 1998).*
Raghavan, Srinivasa R. and Bani H. Cipriano, "Gel Formation: Phase Diagrams Using Tabletop Rheology and Calorimety", Eds. R.G.Weiss and P. Terech, Molecular Gels. Materials with Self-Assembled Fibrillar Networks, Chapter 8, 2006, pp. 241-252 (12 pages).
Sanchez, Angel, "Colorimetric method for the estimation of sol-gel transition of cellulose nanofibrils suspensions", YouTube, Feb. 21, 2017, URL:<https://www.youtube.com/watch?v=asTc4hVJhPk> (video).
Ng, Keng Wooi, "Temperature-sensitive gel", YouTube, Sep. 20, 2018, URL:<https://www.youtube.com/watch?v=N9AAwaL5TrE&list=WL&index=65&t=0s> (video).
Hayashi, Yoshihiro and John B. Blum, "Sol-gel derived PbTiO3: Part 2Structural control of monolithic gels", Journal of Materials Science, SpringerLink, vol. 22, Jul. 1987, pp. 2655-2660 (6 pages).
Iwata, Shuichi et al., "Viscosity measurement of gelcasting slurry during in-situ gelation by a micro X-ray CT scan system", Ceramic International, SciVerse ScienceDirect, Elsevier Ltd., vol. 39, Dec. 2012, pp. 5309-5316 (8 pages).
AlSofi, A. et al., "Portrayal and Demonstration of a Novel Procedure for In-Situ Estimation of Gelation Time", European Association of Geoscientists & Engineers, EAGE Publications BV, Conference Proceedings, IOR 2019—20th European Symposium on Improved Oil Recovery, Apr. 2019, pp. 1-8 (8 pages).
Grattoni, Carlos A. et al., "Rheology and Permeability of Cross-linked Polyacrylamide Gel", Journal of Colloid and Interface Science, Academic Press, vol. 240, Jul. 2001, pp. 601-607 (7 pages).
Bansil, Rama et al., "Effects of gelation on spinodal decomposition kinetics in gelatin", Polymer, Butterworth-Heinemann Ltd., vol. 33, No. 14, 1992, pp. 2961-2969 (9 pages).
Brunelle, Éric et al., "Gelation time in the discrete coagulation-fragmentation equations with a bilinear coagulation kernel", Journal of Physics A: Mathematical and Theoretical, IOP Publishing, vol. 40, Sep. 2007, pp. 11749-11764 (16 pages).
Crisp, Stephen et al., "Gelation of Polyacrylic Acid Aqueous Solutions and the Measurement of Viscosity", Journal of Dental Research, vol. 54, Issue 6, Nov. 1975, pp. 1173-1175 (3 pages).
Dai, Bona and Shingo Matsukawa, "NMR studies of the gelation mechanism and molecular dynamics in agar solutions", Food Hydrocolloids, ScienceDirect, Elsevier Ltd., vol. 26, 2012, pp. 181-186 (6 pages).
Dumas, J. and J.-C. Bacri, "New method of viscosity measurement near the gelatin sol-gel transition", Journal de Physique Archives, vol. 41, No. 12, Jun. 1980, pp. 279-282 (4 pages).
Gaides, G.E. and A.J. McHugh, "Gelation in an amorphous polymer: a discussion of its relation to membrane formation", Polymer, Butterworth & Co. (Publishers) Ltd., vol. 30, Nov. 1989, pp. 2118-2123 (6 pages).
Houari, Ahmed, "Determining the viscosity of liquids using an extended falling ball method", Physics Education, IOP Publishing Ltd, vol. 46, No. 6, Nov. 2011, pp. 688-691 (5 pages).
Huang, H. and C. M. Sorensen, "Shear effects during the gelation of aqueous gelatin", Physical Review E, The American Physical Society, vol. 53, No. 5, May 1996, pp. 5075-5079 (4 pages).
Wang, Jian et al., "A computer-interfaced falling ball viscometer", Journal of Biochemical and Biophysical Methods, Elsevier Science B.V., vol. 28, 1994, pp. 251-261 (11 pages).
International Search Report issued in counterpart International Application No. PCT/US2021/055982, dated Feb. 14, 2022 (2 pages).
Written Opinion issued in counterpart International Application No. PCT/US2021/055982, dated Feb. 14, 2022 (7 pages).

* cited by examiner

STOKES-BASED METHOD TO ESTIMATE GELATION TIME

BACKGROUND

Gelation-time is a key screening parameter in developing potential gel formulations. The gelation time of a gel solution formulation may be conventionally defined as the point at which the gel solution of a polymer and a crosslinker form a gel. From such a definition, the subjectivity of this parameter is clearly demonstrated. Although less subjective methods have been utilized, such as those based on NRM or rheology, the conventional methods for estimating gelation time remain limited to more subjective bottle tests. In such bottle tests, the Sydnax scale is most widely used and provides the conventionally adopted approach for the characterization of gelation-states and the corresponding estimation of gelation time. In using the Sydnax scale, various states (A to J) are defined to represent the observed conditions upon the inversion of a gelant sample, in a bottle.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods for determining the gelation period of a gel solution. Such methods may include introducing a first inert ball into a gel solution container containing a gel solution where upon the first inert ball reaching a bottom of the gel solution container, introducing at least one subsequent inert ball sequentially into the gel solution container until the at least one subsequent inert ball remains fixed in place prior to reaching the bottom of the gel solution container. Methods may further include determining gelation time of the gel solution based on a sum of distances traveled by the first inert ball and at least one subsequent inert ball.

In another aspect, embodiments disclosed herein relate to methods for determining the gelation period of a gel solution including filling one or more hollow inert balls with a solution and introducing a first hollow inert ball into a gel solution container containing a gel solution and a crosslinker where if the first hollow inert ball reaches a bottom of the gel solution container, at least one subsequent hollow inert ball is introduced sequentially into the gel solution container until at least one subsequent hollow inert ball remains fixed in place prior to reaching the bottom of the gel solution container. Methods may further include determining gelation time of the gel solution based on a distance traveled by the first hollow inert ball, if the first hollow inert ball does not reach the bottom of the gel solution container or on a sum of distances traveled by the first hollow inert ball and at least one subsequent inert ball, if the first hollow inert ball reaches the bottom of the gel solution container.

In yet another aspect, embodiments disclosed herein relate to methods for determining the gelation period of a gel solution. Such methods may include introducing a first inert ball into a gel solution container containing a gel solution where the first inert ball travels through gel solution at a velocity as defined by formula (1):

$$v = \frac{2gr^2(\rho_1 - \rho_2)}{9\mu} \tag{1}$$

where v: velocity, cm/sec; $\rho_1$: density of the sphere, g/cm$^3$; $\rho_2$: density of the liquid, g/cm$^3$; g: gravitational constant=980 cm/sec; r: radius of the sphere, cm; and μ: viscosity of the liquid, g/cm·sec (0.01 at 20° C.), and measuring a distance traveled by the inert ball through the gel solution. Methods may further include determining gelation time from the measured distance as calculated from formula (2):

$$t = \frac{9\mu}{2gr^2(\rho_1 - \rho_2)} * L \tag{2}$$

where t equals time to gelation, and L is equal to the distance traveled by the first inert ball after the ball is determined to no longer move through the gel solution.

Other aspects and advantages of the invention will be apparent from the following description and the appended claims.

DETAILED DESCRIPTION

Figure 1:
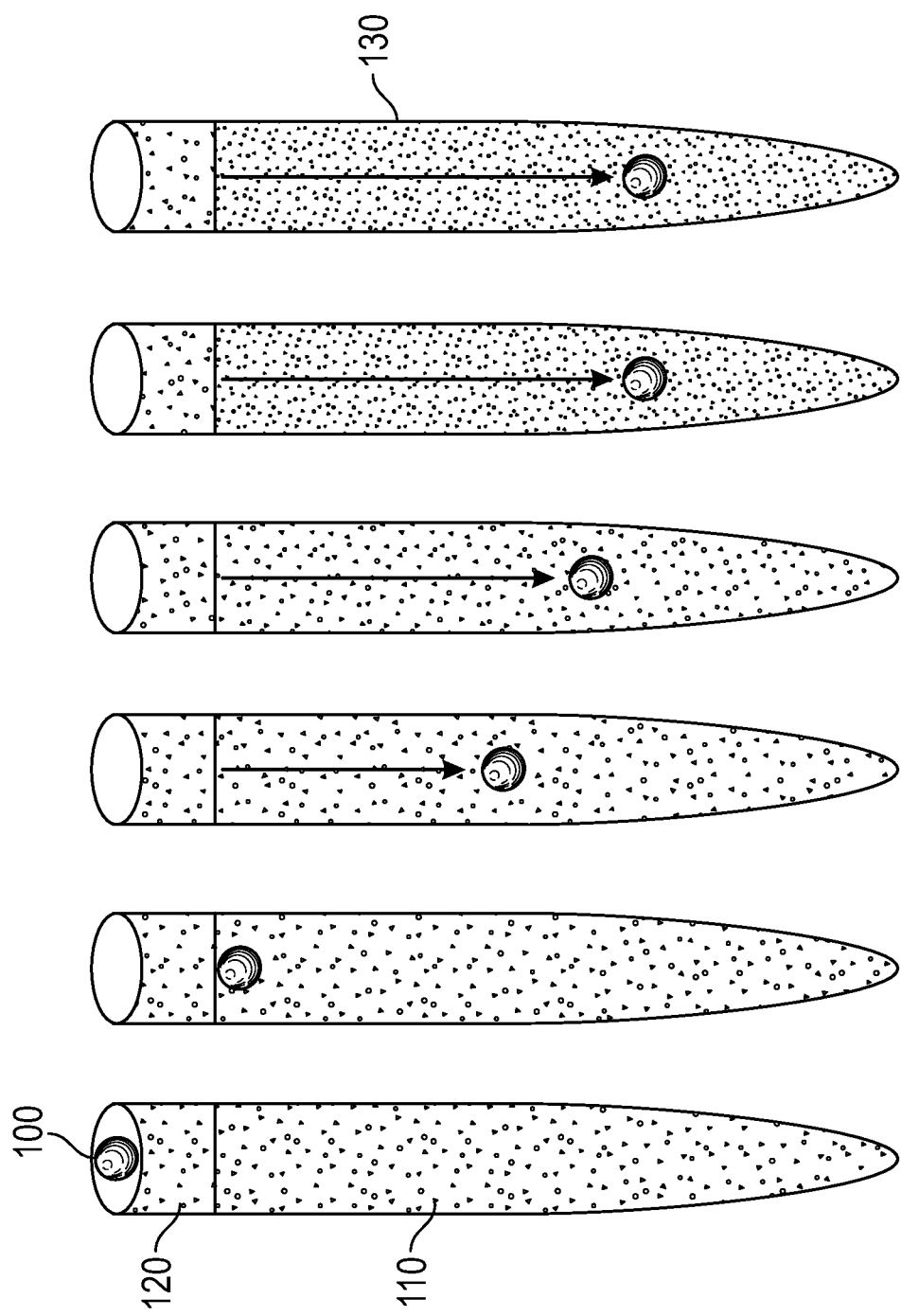
FIG. 1 shows an example diagram of a gel solution container and one or more balls in a gel container.

One or more embodiments of the present disclosure relate to a quantitative methodology to measure gelation times. Embodiments may relate to methods that include the movement of a falling-ball in a confined system through a gelling medium, where the position of the ball upon gelation of the medium may be used as a direct measure of gelation time.

One or more embodiments of the present disclosure relate to method that include falling-ball and bottle test to better determine gel solution gelation times. In one or more embodiments, the methods may rely upon Stokes Law which can be used to convert the final stuck ball position (travel distance), upon gelation of the gel solution, to determine the gelation time of a gel solution. One or more embodiments may be directed to a quantitative methodology to measure gelation times from bottle tests.

Methods may include the incorporation of a ball in a closed container comprising a gel polymer solution. One or more embodiments may relate to systems for determining the gelation time of gel solutions using a falling-ball type method in which the time interval for a moving ball to traverse a predetermined distance through a solution is measured and allows for determination of the gelation time of the gel solutions.

One or more embodiments of the present disclosure relate to a system for determining the gelation time of a gel solution. The system may include a container of a selected height and width and a ball of a selected material, size, and density. The container of a selected height and width may hold or comprise a gel solution that may be reacted for a specific period of time and under specific reaction conditions to form a gel phase.

In one or more embodiments of the present disclosure, a method as described herein may be employed to quantitatively determine the gelation time of the gel solution based upon the distance traveled by the one or more inert balls through the gel. The implementation of this method may reduce the number and frequency of observations required to determine the precise gelation time.

The gel solution may be in a fluid or semi-fluid state and may have an initial viscosity that has been measured or pre-determined. The one or more inert balls used in the methods of the present disclosure may have density that is known to be greater than the density of the gel solution. In this state, the inert balls may travel or sink through the gel solution to the bottom of the container. As the gel solution begins to polymerize, the viscosity of the gel solution will increase, and the inert ball's velocity, as it passes through the solution, will decrease. These relationships are further described and defined in the below Eqs. 1-4.

In one or more embodiments, at later times in the gelation process and before movement of the inert ball is halted due to full gelation, there will be a period of deceleration of the inert ball's velocity due to the increasing viscosity of the gel solution as suggested by Eq. 1.

$$v = \frac{2gr^2(\rho_1 - \rho_2)}{9\mu} \quad (1)$$

where $v$ is velocity (cm/sec), $\rho_1$ is density of the sphere (g/cm$^3$), $\rho_2$ is the density of the liquid (g/cm$^3$), g is the gravitational constant that is equal to 980 cm/sec, r is the radius of the sphere (cm), and $\mu$ is the viscosity of the liquid (g/cm*sec) at (0.01 at 20° C.).

The predicted or measured estimates of the gel solution viscosity at various gel states such as weak, running, full, etc. or even at a single high viscosity that is tens of thousands of times higher (or infinite) can be used via integration to convert the traveled distance of the one or more inert balls into a gelation-time, as shown below through Eqs. 2 and 3

$$d = \int_0^{t_{gelation}} v \, dt \quad (2)$$

$$d = v_{gelant} t_{start\_gelation} + \int_{t_{start\_gelation}}^{t_{gelation}} v \, dt \quad (3)$$

where d is travel distance (cm), $v_{gelation}$ is the terminal velocity based on gel solution initial viscosity, $t_{gelation}$ is the time of final gelation and $t_{start\_gelation}$ is the time at initiation of the gelation process.

In one or more embodiments, it may be assumed that the gelation process from the initial viscosity of the gel solution to full gelation is a fast process and one that can be neglected. During that period the terminal velocity of the ball will be reduced with time and its contribution will also be smaller at that earlier time. With that assumption, the first term in the right hand side of Eq. 3 can be considered. By combining Eqs. 1 and 3, the gelation time of a gel system can be obtained by Eq. 4:

$$t = \frac{9\mu}{2gr^2(\rho_1 - \rho_2)} * L \quad (4)$$

where L is the length of the of the total distance traveled by one or more inert balls through the gel medium, r is the radius of the sphere, $\rho_1$ and $\rho_2$ are the densities of the ball and the gelant solution, respectively, u is the viscosity of the gelant solution, g is the gravitational constant, and t is the total travel time.

Referring now to FIG. 1, FIG. 1 shows a schematic representation of the described method. The schematic shows, from left to right, the progression of the inert ball 100 through the medium 100, such as a gel solution 110, within a gel solution container 120. As the gel solution 110 polymerizes, and the viscosity of the gel solution increases, the inert ball's velocity will decrease until the viscosity of the gel solution reaches a point at which the density of the gel is greater than the density of the of inert ball. This transition indicates that the gel solution 110 has polymerized and formed a gel phase 130.

Figure 2:
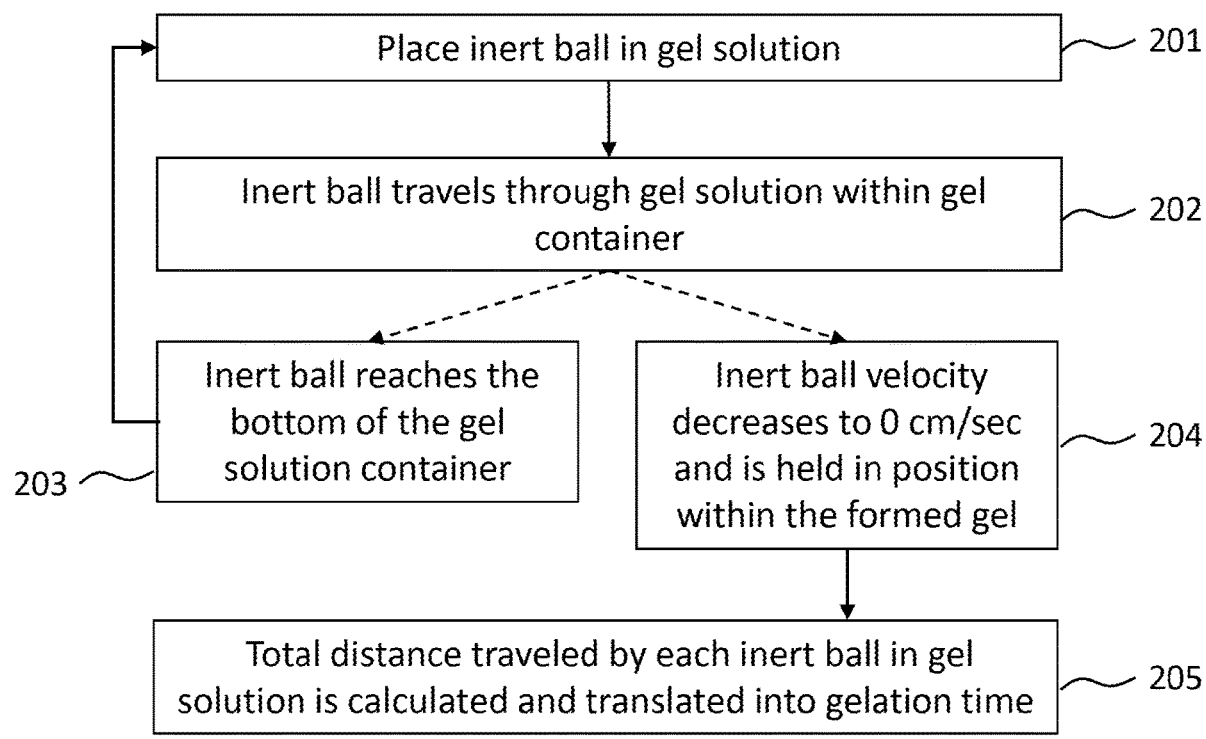
FIG. 2 shows a diagram of the method steps for determining the gelation time of a gel solution.

In some embodiments, the polymerization reaction may occur over a longer period of time. As shown in FIG. 2, after being inserted into the gel solution at element 201, the inert ball may travel through the gel solution at element 202, and the inert ball may travel the entire distance of the gel solution container until it reaches the bottom of the gel solution container at element 203. At this point, the initial element 201 may then be repeated with a subsequent inert ball that may be placed, manually or by an automated mechanism, in the gel solution container at the surface of the gel solution. The one or more subsequent balls may then descend through the gel solution at element 202 until the gel solution viscosity increases to a point at which the velocity of the inert ball decreases to 0 cm/sec at element 204, or the subsequent inert ball reaches the bottom of the gel solution container at element 203. This process may be repeated, with additional subsequent inert balls being placed in the gel solution container, until a final inert ball is held in a constant position by the formed gelled phase at element 204, signaling that the gel solution has formed a gel phase. At this stage, the distance traveled by each ball in a single gel solution container may be compiled and totaled so that the total distance traveled by the one or more inert balls may be converted to into a gelation time of the gel solution at element 205, via Eq. 4.

In one or more embodiments, replicate tests under identical conditions where the gel solution components, gel container dimensions, and inert ball features are duplicated, may be conducted either in parallel or in series to more accurately and precisely delineate the specific gelation time of a gelled solution.

Introduction of Ball

One or more embodiments may include a mechanism by which one or more inert balls may be discharged or introduced into the gel solution container comprising a gel solution and a polymerization cross-linker reactant. In one or more embodiments, the one or more inert balls may be manually placed in the gel solution container at the surface of the gel solution. In one or more embodiments, such mechanisms may ensure that the ball is not dropped from a distance above the gel solution to ensure that the ball enters the gel solution at an initial velocity of 0 cm/sec.

In one or more embodiments, one or more subsequent additional inert balls may be subsequently introduced into the gel solution container containing the gel solution. In such embodiments, the additional subsequent inert balls are not introduced into the gel solution prior to the preceding inert ball reaching the bottom of the gel solution container. Thus, upon an inert ball reaching the bottom of the gel solution container, the additional inert ball is subsequently introduced. The one or more subsequent inert balls may be deployed sequentially in a gel solution container to determine the gelation time of gel solutions with extended gelation periods.

In the method of one or more embodiments, the inert ball may travel through the gel solution at a certain velocity as described by Eq. 1. After the ball is introduced into the gel solution it may travel through the gel until reaching the bottom of the container. At this point, an additional inert ball of identical density and size may be subsequently introduced into the gel solution container at a position on the surface that is proximal to, but not the same as the position of the prior inert ball that preceded it. This process of subsequent balls being introduced upon a preceding ball reaching the bottom of the container may be repeated until a final inert ball remains fixed in place in the gelled solution prior to reaching the bottom of the gel solution container.

In one or more embodiments, the act of releasing the inert ball into the gel solution may be manually completed or by an "automated" process. The term automated, as used herein, may be defined as a process that does not require direct manual interaction by a user. In either method of inserting the inert ball into the gel solution, the method may be adjusted or controlled for certain gel solution formulations with longer gelation times. Specifically, the release of any subsequent additional inert ball may be controlled so that the release is timed to coincide with preceding inert ball reaching the bottom of the gel solution container.

In embodiments where the inert ball release mechanism may be automated, such a mechanism may include within an apparatus where an additional attachment such that the inert ball may be attached by a magnet and suspended just above the gel solution. In one or more embodiments, a mechanism for release of the inert ball may be operated and initiated by signal produced from a sensor that is triggered when a ball reaches the bottom of the gel solution container.

In one or more embodiments, a system may include an enclosure with a high-temperature glassware component. This high-temperature glassware component may serve as a reaction container for a polymer and cross-linker. The system may include a temperature bath of adequate size for immersing the high temperature glass-ware component. Such a system may also include an automated inert ball dispenser as described above, or alternatively a robotic arm or a conveyer belt that may deliver the inert ball to the high-temperature glassware container component. The inert ball may be introduced into the polymer solution held within the high-temperature glassware container component via the automated ball-dispensing mechanism. The system may include a camera mechanism with one or more outputs (such as video out outputs or a USB port) for outputting the digital images to a TV, a computer, or a storage for automated image processing, and may be used to track the movement of the inert ball. The camera mechanism may be mounted adjacent to the high-temperature glassware component.

The image processing may be used to precisely determine the inert ball position and to provide or result in a signal to the dispenser that the inert ball has reached the bottom of the high-temperature glassware container component. The camera may detect the ball has reached the bottom, to trigger the release of a new inert ball.

For example, in one or more embodiments, a high speed camera or a standard camera may be used to record the movement of the inert ball, including deceleration of the ball (while gelation takes place), which may be used to characterize the rheological buildup (transition) of the studied gelant. The detection of the ball as it passes through the gel solution may be performed via image recognition algorithms. In one or more embodiments, the camera system may be connected to a controller that then controls the release of another ball. As such, the automated system may be designed to release one ball at a time which is also tracked by the camera, as described above. The camera can then send a signal to the controller device whenever the floating ball reaches the bottom of the tube allowing the system to release another one, and so on. However, it is also envisioned that if the testing container or the gel solution are not sufficiently transparent (such that the movement of the ball can be detected by camera), that other sensing mechanisms, such as acoustic or inline sensors) may be used.

Inert Ball

In one or more embodiments, the size, material, and density of the ball may partially dictate the manner and velocity at which the inert ball passes through the gel solution during a gelling process, as detailed in Eq. 1. These features of the ball may be specifically selected and controlled based upon the properties of the gel solution to be studied. For example, the inert ball may be at a selected density that is greater than the density of the initial gel solution. The inert ball may also be comprised of a material with at least an outer layer or shell that is unreactive and incapable of dissolving within the gel solution. The ball may also be chemically unreactive to avoid altering the polymerization or reaction of the polymer gel whose gelation is being studied.

In one or more embodiments, the inert ball may have a radius that ranges from 0.01 millimeters (mm) to 10 mm. As discussed, the radius of the inert ball may be specifically selected based upon the diameter or dimensions of the gel solution container. In one or more embodiments, the ball may have a radius of a size such that the ball is not affected by the walls of the container or vial in which it will be placed. In one or more embodiments, the ball may be substantially spherical so that the movement through the polymer gel solution is unimpacted by orientation of the ball as it falls. The properties of the gel solution and the velocity of the ball may be adversely affected at the proximal edges or walls of the gel solution container. Thus, the gel solution container should be sufficiently large enough so that the walls of the container are separated from the outer surface of the inert ball and each subsequent ball introduced into the container, given that each subsequent ball may be placed at a unique position. That is, if the ball falls along or parallel to the z-axis of the gel container, each ball is placed at a unique position relative to the x- and y-axis of the gel container so that the path along or parallel the z-axis traversed by each ball is unique. The size of the ball is also related to the ultimate density of the ball and may be selected in combination with the consideration of the specific material of the ball and the properties of the gelation solution. As described, the density of the gel solution may be less than the density of the one or more inert balls.

In embodiments as described previously, multiple inert balls may be employed, particularly when measuring the gelation time of gel solutions with longer gelation periods. In such embodiments, each inert ball may have an identical size, shape, material, and corresponding density.

Material of Ball

In one or more embodiments, the ball may be comprised of a sufficiently inert and unreactive material that is also insoluble so as not to affect or alter the polymerization of the gel solution. In one or more embodiments, the inert ball may be comprised of a metal or glass. In one or more embodiments, the ball may be comprised of a material such as steel, silica, carbon, stainless steel, refractory metals, ceramics or a combination thereof.

In one or more embodiments, the one or more inert balls may have a density that is between 0.02% and 4% greater than the density of the polymer gel solution. In one or more embodiments, the inert balls may have density greater than the density of the polymer gel solution being tested ranging from a lower limit of any of 0.02, 0.03, 0.04, and 0.05% to an upper limit of any of 1.0, 1.5, 2.0, 2.5, 3.5, 3.5 and 4%, where any lower limit may be combined with any mathematically feasible upper limit. In one or more embodiments, the one or more inert balls may have a density that is between 0.05% and 4% greater than the density of the polymer gel solution.

In one or more particular embodiments, the inert ball may have a density that is less than 4% greater than density of the gel solution. In some embodiments, the inert ball may have a density that is less than 3% greater than density of the gel solution. In yet other embodiments, the inert ball may have a density that is less than 2% greater than density of the gel solution.

In one or more embodiments, the method may include the incorporation of an inert hollow ball that is designed with an extremely light spherically shaped shell and a hollow center. The hollow inert balls may be filled with the same polymer being tested in the gel solution, only without the cross-linker. The hollow inert ball may alternatively be filled with any analogous fluid of similar density, so long as the resulting density of the inert ball is greater than the density of the gelation solution.

In one or more embodiments, the hollow balls comprising the polymer being tested, or a fluid of similar density, may be characterized as having a density that will reduce the difference in densities between the gelation solution and the inert ball, as described in Eq. 1. When this difference in density is reduced to be very small, it will result in the reduction of the terminal velocity of the inert ball. Ultimately this reduction in the terminal velocity will further result in an increase in the travel time of the hollow ball through the fluid. The hollow spherically shaped balls may be used in gel solutions with longer gelation periods where multiple balls may be required to determine the gelation time. By incorporating hollow inert balls, a fewer number of balls may be required. Such reduction in a number of balls may also be achieved by using a solid ball that has a similarly density difference relative to the gel solution.

In one or more embodiments, the inert ball may have an outer shell that is comprised of a material that may be inert and unreactive with the gel solution. In one or more embodiments, the outer shell of the ball may be comprised of a thin metal or a formed glass. In one or more embodiments, the hollow inert ball may have a radius ranging from 0.01 mm to 5 mm, and a thickness of the shell ranging from 0.001 mm to 1 mm. In one or more embodiments, the ball may be comprised of a material such as steel, silica, carbon, stainless steel, refractory metals, certain ceramic, or a mixture thereof.

In one or more embodiments the one or more hollow balls, when filled, may have a density that is between 0.02% and 4% greater than the density of the polymer gel solution. In one or more embodiments, the inert balls may have density greater than the density of the polymer gel solution being tested ranging from a lower limit of any of 0.02, 0.03, 0.04, and 0.05% to an upper limit of any of 1.0, 1.5, 2.0, 2.5, 3.5, 3.5 and 4%, greater than the density of the polymer gel solution being tested, where any lower limit may be combined with any mathematically feasible upper limit.

In one or more embodiments of the present disclosure, the gel solution container should be comprised of an inert and unreactive material. The gel solution container may be comprised of glass material that has a high degree of transparency. The gel solution container should allow for clear observation of the gel solution and the inert ball. In one or more embodiments, the gel solution container may be comprised of a material that is stable and unreactive, both physically and chemically at temperatures up to at least 150° C. to 200° C. For Example, in one or more embodiments, the gel solution container may be comprised of glass.

In one or more embodiments, the gel solution container should be of cylindrical shape and may have an ovoid or oval shaped bottom, or a flat bottom. In one or more embodiments, the diameter of the gel solution container is not specifically limited, but should be sufficiently large enough to not impede or affect the movement of the inert ball as it passes through the solution, as described. In one or more embodiments, the height of the gel solution container is not particularly limited, though the gel solution container may be of a height of at least 30 cm or more, and should have a diameter such that large amounts of the gel solution polymer and cross linker are not required or wasted.

In one or more embodiments, the polymerization reaction may require increased temperatures to catalyze or conduct the polymerization reaction. The method according to one or more embodiments of the present disclosure may be conducted under ambient conditions or at elevated and controlled temperatures that may range from 90 to 180° C., depending upon the specific polymerization reaction. In one or more embodiments, the gelation tests may be conducted in an oven to provide more precise control of the temperature of the gelation reaction.

In one or more embodiments, the gel solution container may be graduated or marked in millimeter and/or centimeter increments to provide reference points for the distance traveled by the inert ball through the gel solution. In one or more embodiments, the distance traveled by the inert ball may be measured by the change in position of the bottom most-point of the inert ball in the gel solution.

This particular disclosure is not specifically limited to any polymer and/or cross-linker combination. Rather, the present disclosure is provided to disclose methods relating to the precise determination of the gelling time of gel solution formulations that may experience any duration of gelation time.

In one or more embodiments, additional characterization methods may be coupled with the ball and container method described in one or more embodiments of the present disclosure. In one or more embodiments, alternative characterization methods that may be coupled with the ball and container method may include X-ray CT, UV light, NMR, or a combination thereof.

Example

The following examples are illustrative and should not be interpreted as limiting the scope of the present disclosure. The following example is provided to demonstrate how a gelation time may be calculated based upon the distance traveled by the inert ball in an example system.

Accordingly, in Example 1, a hypothetical design for such system is provided. In this example calculation, the system was designed with a column height of 60 cm. The inert ball is designed with a radius of 0.1 mm and a density of 0.96 g/cm³. A gel solution is prepared with a density of 0.94 at 90° C. The initial viscosity of the gel solution is assumed to be 0.0938 g/cm*sec at 90° C.

In such a setup, and according to Eq. 4, the ball will reach the bottom of the column after 5.982 hrs. Therefore, if the gel solution formulation has a characteristic gelation-time of 2.75 hr. The ball in the prescribed design and with the earlier assumption will be stop in the gel solution and be trapped by the gel solution after a total travel distance of 45.97 cm.

Accordingly, under the described set-up, and by using the above Eqs. 1-4, the gelation time may be accurately calculated from the distance traveled by an inert ball through a gel solution undergoing a gelation reaction.

The presently disclosed systems, apparatuses, methods, processes and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

Ranges may be expressed as from about one particular value to about another particular value, inclusive. When such a range is expressed, it is to be understood that another embodiment is from the one particular value to the other particular value, along with all particular values and combinations thereof within the range.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

The invention claimed is:

1. A method for determining the gelation period of a gel solution comprising:
    introducing a first inert ball of a plurality of inert balls into a gel solution container containing a gel solution;
    upon the first inert ball reaching a bottom of the gel solution container containing the gel solution, introducing a subsequent inert ball of the plurality of inert balls into the gel solution container;
    continuing to introduce additional subsequent inert balls into the gel solution container each preceding inert ball reaching the bottom of the gel solution container until a final inert ball of the plurality of inert balls remains fixed in place prior to reaching the bottom of the gel solution container; and
    determining the gelation time of the gel solution based on a sum of distances, L, traveled by every inert ball introduced into the gel solution after each inert ball is determined to no longer move through the gel solution, wherein the inert balls travel through the gel solution at a velocity as defined by formula (1):

$$v = \frac{2gr^2(\rho_1 - \rho_2)}{9\mu} \qquad (1)$$

where v equals the velocity in cm/sec; $\rho_1$ equals the density of each inert ball in g/cm³; $\rho_2$ equals the density of the gel solution in g/cm³; g equals the gravitational constant: 980 cm/sec²; r equals the radius of each inert ball in cm; and u equals the viscosity of the gel solution; and
    determining the gelation time, t, from the measured distance, L, as calculated from formula (2):

$$t = \frac{9\mu}{2gr^2(\rho_1 - \rho_2)} * L. \qquad (2)$$

2. The method of claim 1, wherein the radius of each inert ball ranges from 0.1 to 10 mm.

3. The method of claim 1, wherein each inert ball is comprised of a material selected from the group consisting of steel, silica glass, refractory metals, ceramics, or a combination thereof.

4. The method of claim 1, wherein the density of each inert ball is less than 20% greater than the density of the gel solution, prior to gelation.

5. The method of claim 1, where the gel solution container is placed in an oven to control the temperature of the gelation polymerization.

6. The method of claim 5, wherein the gelation reaction is conducted at a temperature ranging from 90 to 180° C.

7. The method of claim 1, wherein at least one inert ball of a plurality of inert balls is introduced into the gel solution container at a point on the gel surface that is different than the point of introduction of another of the plurality of inert balls.

8. A method for determining the gelation period of a gel solution comprising:
    filling of a plurality of hollow inert balls with a solution;
    introducing a first hollow inert ball of the plurality of hollow inert balls into a gel solution container containing a gel solution and a crosslinker;
    upon the first inert hollow ball reaching a bottom of the gel solution container, introducing a subsequent hollow inert ball into the gel solution container,
    continuing to introduce additional subsequent hollow inert balls of the plurality of hollow inert balls into the gel solution container upon each preceding hollow inert ball reaching the bottom of the container until a final hollow inert ball remains fixed in place prior to reaching the bottom of the gel solution container; and determining the gelation time of the gel solution based on a sum of distances, L, traveled by every inert hollow ball introduced into the gel solution, wherein the inert hollow balls travel through the gel solution at a velocity as defined by formula (1):

$$v = \frac{2gr^2(\rho_1 - \rho_2)}{9\mu} \quad (1)$$

where v equals velocity in cm/sec; $\rho_1$ equals the density of each hollow inert ball filled with the solution in g/cm$^3$; $\rho_2$ equals the density of the gel solution and crosslinker in g/cm$^3$; g equals the gravitational constant: 980 cm/sec; r equals radius of each hollow inert ball in cm; u equals viscosity of the gel solution and crosslinker; and determining the gelation time, t, from the measured distance, L, as calculated from formula (2):

$$t = \frac{9\mu}{2gr^2(\rho_1 - \rho_2)} * L. \quad (2)$$

9. The method of claim 8, wherein each hollow inert ball is filled with the gel solution and do not comprise a reactive cross-linker.

10. The method of claim 8, wherein the solution that fills the hollow inert balls comprises a fluid that possesses a density that is equal to or greater than the density of the gel solution.

11. The method of claim 8, wherein the density of each hollow inert ball ranges from 1% to 5% greater than the density of the gel solution.

12. The method of claim 8, wherein the radius of each hollow inert ball ranges from 0.1 mm to 5 mm.

13. The method of claim 8, wherein each hollow inert ball has the same density, radius, and is comprised of the same solution.

14. The method of claim 8, wherein each hollow inert ball comprises a thin shell that is comprised of a material selected from the group consisting of steel, glass, refractory metals, ceramics, or a combination thereof.

15. A method for determining the gelation time of a gel solution comprising:
introducing a first inert ball into a gel solution container containing a gel solution;
wherein the first inert ball travels through gel solution at a velocity as defined by formula (1):

$$v = \frac{2gr^2(\rho_1 - \rho_2)}{9\mu} \quad (1)$$

where v: velocity, cm/sec; $\rho_1$: density of the inert ball, g/cm$^3$; $\rho_2$: density of the liquid, g/cm$^3$; g: gravitational constant=980 cm/sec$^2$; r: radius of the sphere, cm; µ: viscosity of the gel solution measuring a distance traveled by the inert ball through the gel solution; and determining gelation time from the measured distance as calculated from formula (2):

$$t = \frac{9\mu}{2gr^2(\rho_1 - \rho_2)} * L. \quad (2)$$

where t equals time to gelation, and L is equal to the distance traveled by the first inert ball after the ball is determined to no longer move through the gel solution.

16. The method of claim 15, wherein the inert ball has a radius ranging from 0.1 mm to 10 mm.

17. The method of claim 15, wherein the inert ball is a hollow inert ball.

18. The method of claim 15, where the gelation container is placed in an oven to control the temperature of the gelation polymerization.

19. The method of claim 15, wherein the gelation reaction is conducted at a temperature ranging from 90 to 180° C.

20. The method of claim 15, wherein upon the first inert ball reaching a bottom of the gel solution container, introducing a subsequent inert ball into the gel solution container containing the gel solution; continuing to introduce additional subsequent inert balls into the gel solution container upon each preceding inert ball reaching the bottom of the gel solution container until a final inert ball remains fixed in place prior to reaching the bottom of the gel solution container; and determining gelation time of the gel solution based on a sum of the total distance traveled by the first inert ball and the subsequent inert ball, as defined in formula (2).

* * * * *